(No Model.) 2 Sheets—Sheet 1.
J. HILLSON.
TIN PAN.
No. 501,248. Patented July 11, 1893.
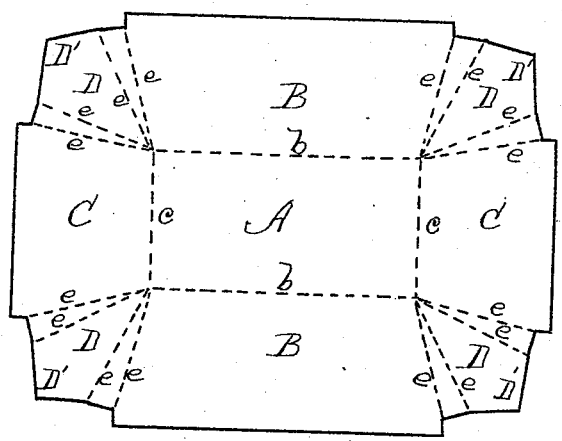
Fig. 1.
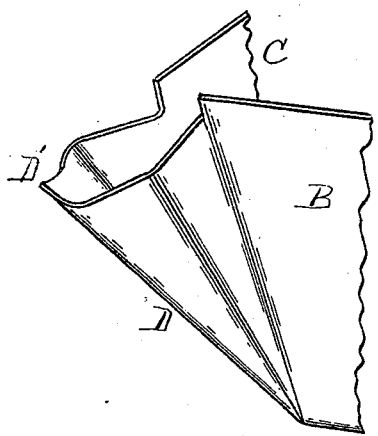 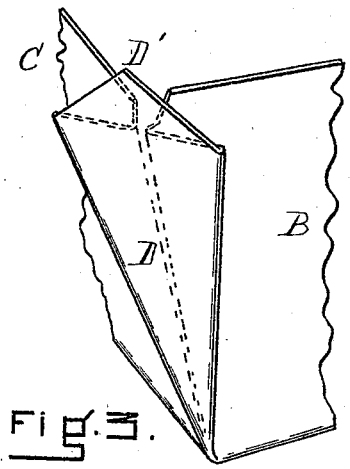
Fig. 2.  Fig. 3.
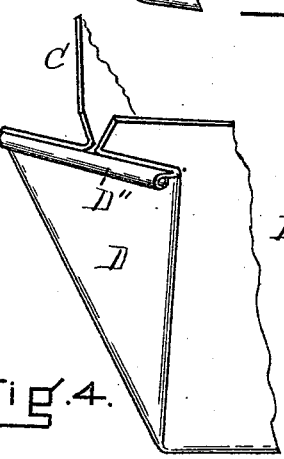 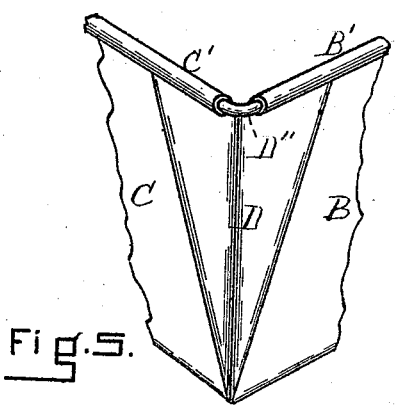
Fig. 4.  Fig. 5.
WITNESSES.
J. M. Hartnett.
A. G. Belcher.
INVENTOR
Joseph Hillson
By his Atty.
Henry W. Williams (No Model.) 2 Sheets—Sheet 2.

J. HILLSON.
TIN PAN.

No. 501,248. Patented July 11, 1893.

WITNESSES
J. M. Hartnett,
A. G. Belcher

INVENTOR
Joseph Hillson,
By his Atty
Henry W. Williams

UNITED STATES PATENT OFFICE.

JOSEPH HILLSON, OF CAMBRIDGE, MASSACHUSETTS.

TIN PAN.

SPECIFICATION forming part of Letters Patent No. 501,248, dated July 11, 1893.

Application filed November 11, 1892. Serial No. 451,614. (No model.)

*To all whom it may concern:*

Be it known that I, JOSEPH HILLSON, a citizen of the United States, residing at Cambridge, in the county of Middlesex and State of Massachusetts, have invented a new and useful Improvement in Tin Pans, of which the following is a specification.

This invention relates to the construction of tin pans, with especial reference to the corners, the particular object being to so construct the pan and fold the tin at the corners, that the completed pan will be very stiff and rigid, and that without the employment of wire at or around its edges. In tin pans as at present constructed, the surplus tin at the corners is folded entirely inward against the ends of the pan, and in order to produce a rigid pan, the upper edges are folded over a wire which extends horizontally around the pan. In a tin pan constructed in accordance with my invention the folds at the corners extend on both sides thereof, that is, the fold at each corner extends inward on the end and on the side of the pan, while the upper edge of the tin constituting the outer portion of the fold is rolled outwardly and the upper edges of the sides and ends rolled outwardly around and over the corner rolls, so that the sides, ends and corners are all provided with outward rolls or folds or beads which are practically continuous and render the pan so stiff and rigid that no wire is or need be inserted in the folds.

Figure 6:
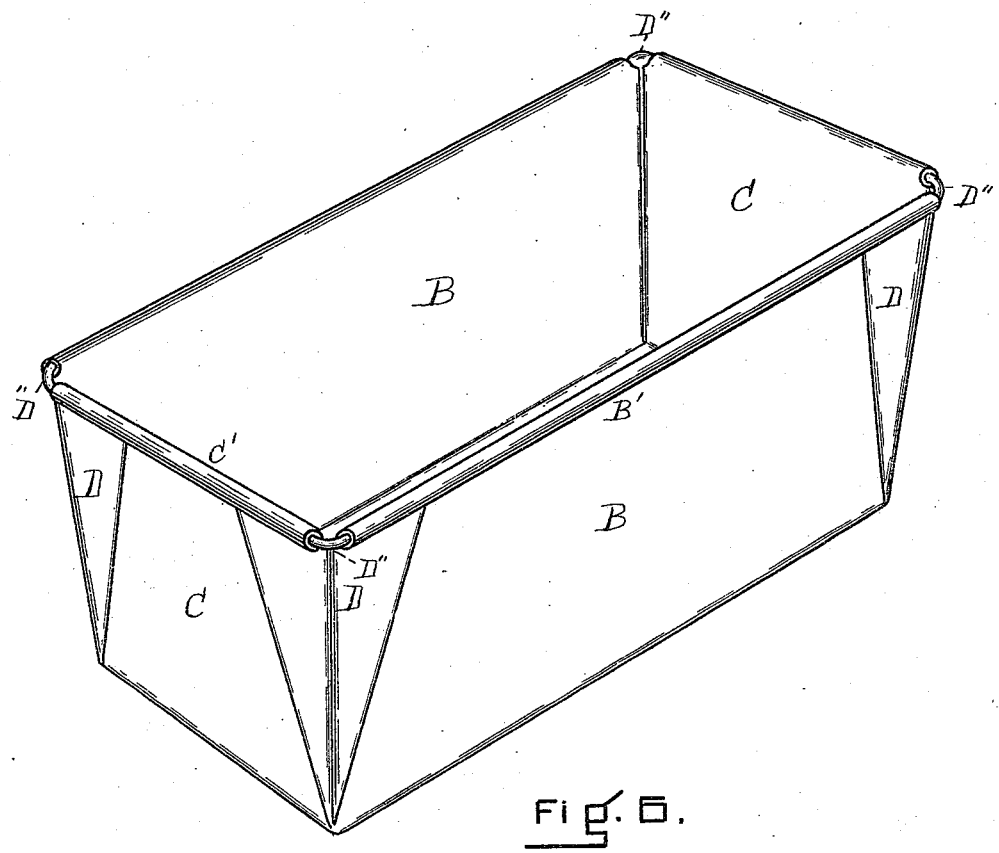
Figures 7, 8:
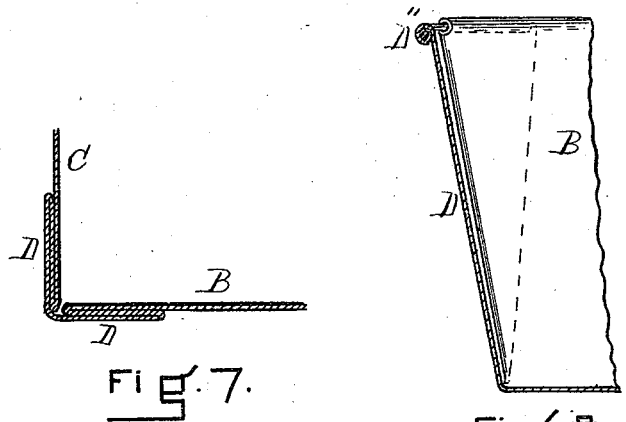

In the accompanying drawings, in which similar letters of reference indicate like parts, Figure 1 represents the blank from which my tin pan is constructed, the broken lines indicating the lines of the several folds. Fig. 2 represents a corner of the pan when the first step has been taken toward forming it. Fig. 3 is a similar view showing the next step in forming the corner. Fig. 4 is a similar view showing the upper edge of the corner portion rolled over. Fig. 5 is a similar view showing a completed corner. Fig. 6 is a view in perspective of the completed pan. Fig. 7 is a horizontal section. Fig. 8 is a vertical section taken through the corner.

A represents the stock forming the bottom portion of the pan, B B the stock forming the side portions, C C the end portions, and D D the stock forming the corners or corner folds. It will be noticed by reference to Figs. 1, 2, and 3, that each corner portion is cut so as to produce a central extension D'.

In the construction of the pan, the sides and ends B C are first bent up on the lines b, c, Fig. 1, with the effect that each corner portion D assumes essentially the shape shown in Fig. 2. The portion D is then pressed in centrally, diagonally, that is, in a line which is at an angle of twenty-two and one-half degrees with the adjacent side and end, until it is flattened into the shape shown in Fig. 3. This leaves the portion D' projecting up as shown in said figure. Next, the portion D' is rolled outward upon itself as shown in Fig. 4. Next, the fold produced by the corner portion D is pressed against the side and end, and the fold D'' produced by the rolled corner D' bent around the corner with the portion D, and the upper edges of the sides and ends bent outward over said folds D'' into folds B' C', all as shown in Figs. 5, 6, and 8. Thus it will be seen that the corner folds D, instead of being bent each into one triangular fold extending inwardly against the ends, are each bent on the broken lines e Fig. 1, and folded on both sides of the corners against the ends and sides C B, thus reinforcing the pan on both sides of the corners. The folds or beads D'' present the appearance of, but of course are not actually, wires, and in connection with the folds or beads B' C', render the corners, and hence the pan as a whole, remarkably stiff, rigid and strong, and moreover, do away with the space which, in a wired pan, occurs between the wire and the tin at the corners.

Having thus fully described my invention, what I claim, and desire to secure by Letters Patent, is—

1. A tin pan of substantially the character described, having its corner pieces or folds D folded against the sides and ends of the pan on both sides of the corners, substantially as set forth.

2. A tin pan of the character described, provided with corresponding pieces or folds D having extensions D', said corner pieces being folded against the sides and ends of the pan on both sides of the corner, and said extensions D' being rolled over upon themselves so as to constitute folds or beads D'' which are bent around and extend upon both sides of the corners, substantially as described.

3. A tin pan of the character described, provided with corner pieces or folds D having extensions D', said corner pieces being folded against the sides and ends of the pan on both sides of the corners, said extensions D' being rolled over upon themselves so as to constitute folds or beads D'' which are bent around and extend upon both sides of the corners, and with the upper edges of the side and end portions B C folded or bent over and around the folds or beads D'' into folds or beads B' C', substantially as set forth.

JOSEPH HILLSON.

Witnesses:
HENRY W. WILLIAMS,
J. M. HARTNETT.